United States Patent [19]
Nordström

[11] Patent Number: 5,829,792
[45] Date of Patent: Nov. 3, 1998

[54] TUBE COUPLING WITH AN INDICATOR DEVICE EMPLOYED FOR VISUAL INSPECTION OF THE PROPER LOCKING/SEALING POSITION

[75] Inventor: Olle Nordström, Mjolby, Sweden

[73] Assignee: Hycop AB, Motala, Sweden

[21] Appl. No.: 793,554

[22] PCT Filed: Sep. 5, 1995

[86] PCT No.: PCT/SE95/00997
§ 371 Date: Feb. 21, 1997
§ 102(e) Date: Feb. 21, 1997

[87] PCT Pub. No.: WO96/07849
PCT Pub. Date: Mar. 14, 1996

[30] Foreign Application Priority Data
Sep. 6, 1994 [SE] Sweden .................................. 9402977

[51] Int. Cl.⁶ .................................................. F16L 35/00
[52] U.S. Cl. ............................ 285/93; 285/321; 285/921
[58] Field of Search ............................... 285/93, 321, 921

[56] References Cited
U.S. PATENT DOCUMENTS

| | | | |
|---|---|---|---|
| 2,956,819 | 10/1960 | Sies ........................................... | 285/93 |
| 4,753,458 | 6/1988 | Case et al. ................................. | 285/93 |
| 4,881,760 | 11/1989 | Runkles ..................................... | 285/93 |
| 4,895,396 | 1/1990 | Washizu ..................................... | 285/93 |
| 4,925,217 | 5/1990 | Ketcham .................................... | 285/93 |
| 5,226,680 | 7/1993 | Bahner et al. ............................. | 285/93 |

*Primary Examiner*—Dave W. Arola
*Attorney, Agent, or Firm*—Moore & Van Allen, PLLC

[57] ABSTRACT

A coupling arrangement comprising male and female pipe coupling parts. The arrangement comprises a body which can be connected to the male part, with two elongate elements which are connected by a ring acting as a radial spring and which define between themselves a slit aperture, which is covered by a strip of non-transparent, flexible material which comprises a transparent window or a through hole. One end of the body is formed with a radially projecting flange, which is adapted to engage behind a radially inwardly directed flange on the female part, defining a locking position. There is an indicator member which is axially displaceable within the body and adapted such that it moved by the female part against the effect of a spring member. In the locking position, a symbol on the indicator member, which symbol indicates this locking position, is visible in the window.

8 Claims, 3 Drawing Sheets

TUBE COUPLING WITH AN INDICATOR DEVICE EMPLOYED FOR VISUAL INSPECTION OF THE PROPER LOCKING/SEALING POSITION

The present invention relates to an arrangement comprising male and female pipe coupling parts for detachably securing said parts to each other in a predetermined locking position.

In the case of such arrangements of known type the construction is often such that a snap-in sound is produced when the male and female parts reach the predetermined locking position. However, this snap-in sound is frequently masked by another, disturbing noise produced, for example, when a given product is subsequently mounted, or the other sound gives the impression that it was the snap-in sound which was heard. In both cases there is a risk of the coupling leaking and of the male and female parts separating from each other when pressure is applied. An especial disadvantage is the fact that an incorrect connection of the male and female parts cannot simply be observed but the coupling has to be subjected to a thorough and expensive check.

Indicator rings are also known which are adapted to indicate a locking position between a male and female part in that, under the effect of the one or other of said parts, they momentarily indicate an earlier starting position. If the pipe coupling and the associated pipeline extend substantially horizontally, the indicator ring is caught and no damage occurs but in another case the ring, extending along the pipeline, can reach a position in which it cannot be seen and possibly impedes the mobility between the two parts.

The object of the present invention is to provide an arrangement of the initially mentioned type which gives a clear, visible and repeated indication of the correct locking/sealing position between the male and female parts and thereby avoids the above-mentioned disadvantages associated with solutions known hitherto. This object is achieved in that the arrangement firstly comprises a substantially tubular body which can be operatively connected to the male part and which is formed with a slit aperture having longitudinal slit edges which can be moved close to one another by the resilient compression of the pipe, and which slit aperture is covered by a strip of a non-transparent, flexible material which is extended when the body is not actuated and, in the extended state, displays a transparent window or a through-hole which is adapted to be rendered invisible by means of the fold in the strip when the body is compressed, and which body, at its one end which is to face the female part, is formed with a radially projecting flange which is interrupted by the slit aperture and which is adapted so that, when the body springs back, this flange engages behind a radially inwardly directed flange on the female part such that this engagement defines the locking position; the arrangement secondly comprises an indicator member which is disposed in the body so as to be axially displaceable and which is adapted such that, under the effect of a spring member, it is displaced by the female part so that, in the locking position, a symbol on the indicator member, which symbol marks this position, is visible in the window or in the through-hole in the strip which is extended in the locking position.

In the following, the invention will be explained in greater detail with reference to the enclosed drawings, in which.

Figure 1:
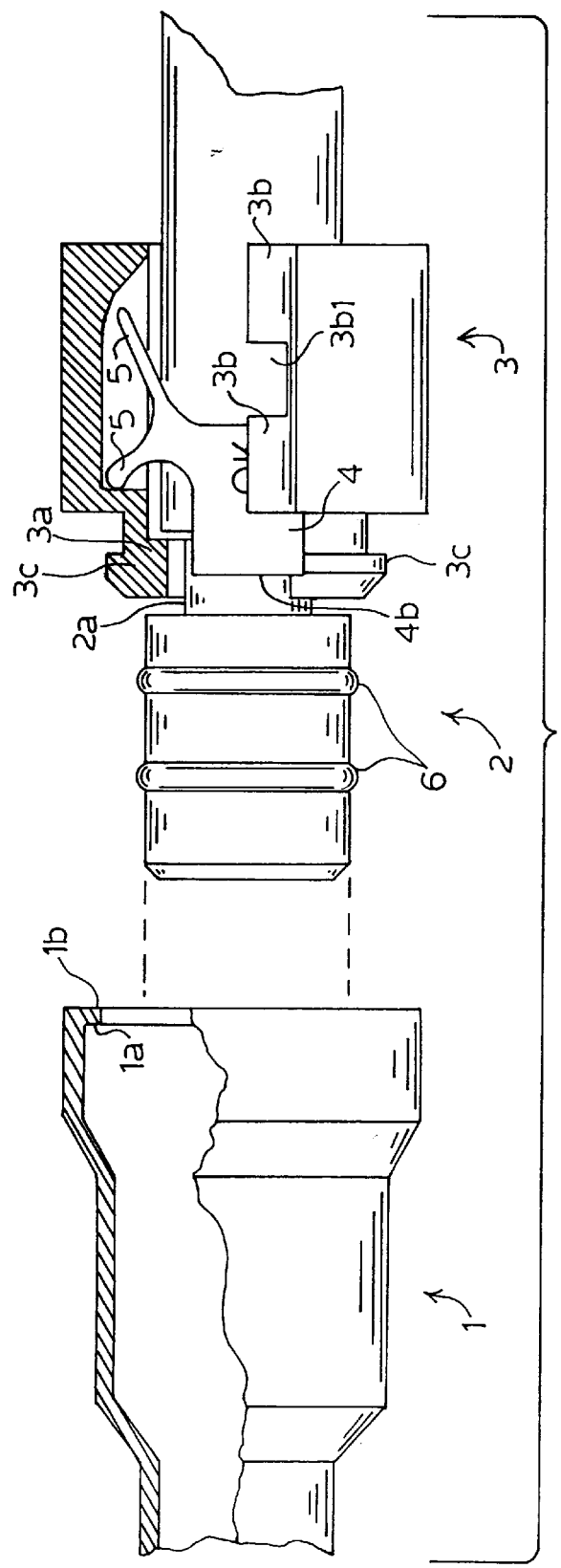
FIG. 1 shows schematically and partially in section a female part and an embodiment of an arrangement according to the invention mounted on a male coupling part.

In the drawings, 1, 2 generally designate a female part and a male part, respectively, which are to be connected and, in the embodiment shown in the drawings, are formed by cold-shaping at the ends of two pipes which are to be coupled together, as is explained in greater detail in SE-AO-9402834-7. However, the arrangement according to the invention, which will now be explained, is not restricted to the above-mentioned pipe coupling but can be used for many other types of pipe coupling.

In the drawings, 3 designates a substantially tubular body which, in FIG. 1, is connected to the male part 2 by means of a radially inwardly directed flange 3a which engages an annular groove 2a in the male part 2. The body 3 has a slit aperture covered by a strip 3b. The strip 3b is made from a non-transparent flexible material preferably in one piece with the body 3 and its flange 3a and comprises a transparent window 3b1; as an alternative to the window, a through-hole can be provided. The longitudinal edges of the slit can be moved together by resilient compression of the body 3, whereby, in the compressed state, the strip 3b is folded so that it is impossible to see through the window 3b1 or through-hole. When the body 3 is not compressed, the strip 3b is extended such that the window or through-hole is visible.

At its end facing the female part 1 the body 3 comprises a radially projecting flange 3c which is interrupted by the slit aperture and which is adapted such that, when the body springs back from the compressed state, this flange engages behind an annular flange 1a in the female part 1. In a distinct manner known per se, this engagement defines the predetermined locking position. The flange 3c and the above-mentioned radially inwardly directed flange 3a are preferably disposed exactly opposite each other.

An indicator member 4 in the form of a slide is disposed in the body 3 so as to be axially movable. The indicator member is adapted so that, under the effect of a spring member 5, it is displaced by the female part 1 so that, in the locking position, a symbol 4a on the indicator slide 4, which symbol indicates the locking position, can be seen through the window 3b1. In the embodiment shown in the drawings, the effect of the female part on the indicator member 4 is brought about by surfaces 1b and 4b on the female part and indicator member 4, respectively. These surfaces abut each other from the position shown in FIG. 2 to the locking position shown in FIG. 3. The indicator and spring members 4 and 5, respectively, are preferably produced in one piece, as shown in FIGS. 1 and 3. In the locking position, leak-tightness between the male and female parts 2 and 1, respectively, is brought about by two O-rings 6 disposed in annular grooves in the male part 2.

The arrangement according to the invention operates as follows:

In FIG. 1, the body 3 is moved over the front of the male part 2 and is secured in a well-defined position by the annular flange 3a which engages an annular groove 2a. No indication is visible in the window 3a since this indication is concealed behind the left-hand half of the cover strip 3b.

Figure 2:
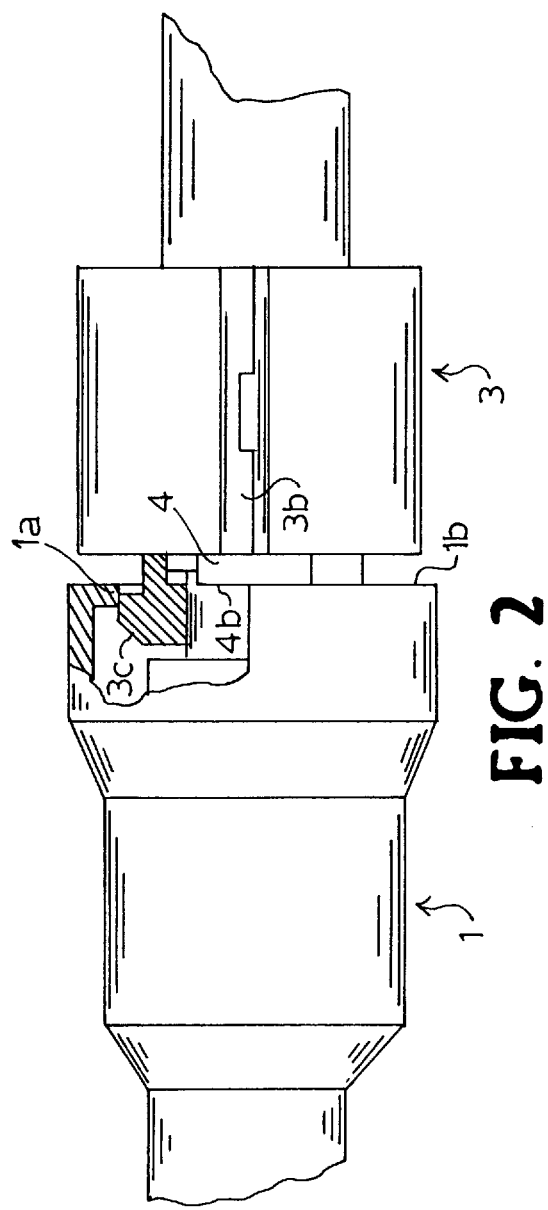
FIG. 2 shows the arrangement with the male part introduced into a female part but with the parts not yet in the locking position.
Figure 3:
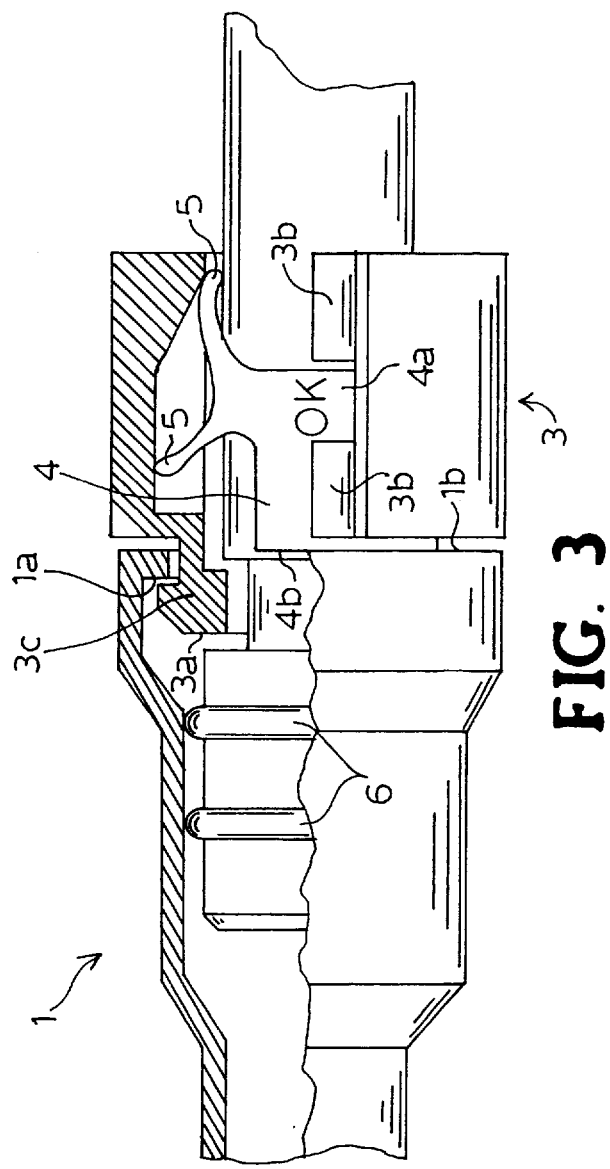
FIG. 3 shows the male part in the correct locking position in the female part, as indicated by the arrangement according to the invention.

FIG. 2 illustrates the manner in which the body 3 is manually compressed radially so that the annular flange 3c can be moved through the aperture in the female part 1, which aperture is delimited by the annular flange 1a. Owing to the radial compression, the cover strip 3b is folded so that the indication is not visible through the window. This is a reliable sign that the desired locking position has not been reached.

In FIG. 3, the annular flange 3c engages behind the annular flange 1a. The body 3 has been able to spring back radially, as a result of which the cover strip 3b is extended so that the window 3b1 is opened. Under the effect of the spring member 5, the flange 1a on the female part 1 has moved the indicator member 4 towards the right-hand side in the Figures so that the marking OK, for example, is visible in the window 3b. This is a reliable sign that the male and female parts 2 and 1, respectively, have reached the predetermined locking position. It should be noted that the fact that the marking OK is visible in the window means that the locking position has been reached both axially and radially.

I claim:

1. A coupling arrangement for detachably securing a male pipe part to a female pipe part in a predetermined locking position, the female pipe part having a radially inwardly directed flange at its end, the coupling arrangement comprising:
   a. a substantially tubular body adapted to be operatively connected to the male pipe part, said body having:
      i. a slit aperture with longitudinal slit edges which can be brought together by compression of the body; and
      ii. a radially outwardly projecting flange at one end of the body, said radially outwardly projecting flange being interrupted by the slit aperture and being disposed such that, when the end of the body is inserted into the female pipe part and the body is released, the radially outwardly projecting flange engages behind the radially inwardly directed flange on the female pipe part, thereby defining the locking position; and
   b. means for providing a visual indication that the locking position has been achieved.

2. A coupling arrangement as recited in claim 1, wherein said means for providing a visual indication that the locking position has been achieved comprises:
   a. a strip of non-transparent, flexible material having an opening, said flexible material connecting the longitudinal slit edges and covering at least a portion of the slit aperture, wherein said strip is disposed such that:
      i. the bringing of said longitudinal slit edges together by compression of the body causes said strip to fold, thereby reducing the size of the opening and substantially preventing a user of the arrangement from seeing through the opening; and
      ii. the movement of said longitudinal slit edges away from each other when the body is released causes said strip to unfold, thereby restoring the opening to its original size and allowing a user of the arrangement to see through the opening;
   b. an indicator member positioned in the body so as to be axially displaceable, said indicator member bearing a symbol signifying the locking position and being disposed such that when the locking position is achieved, said indicator member is displaced by the female pipe part to a position within the body wherein the symbol is visible through the opening of the strip; and
   c. a spring member disposed in the body so as to bias the indicator member toward the end of the body when the indicator member is not displaced by the female pipe part.

3. A coupling arrangement as recited in claim 2, wherein the opening of the strip is a transparent window.

4. A coupling arrangement as recited in claim 2, wherein the opening of the strip is a through-hole.

5. A coupling arrangement as recited in claim 2, wherein the body, the radially outwardly projecting flange, and the strip are produced together in one piece.

6. A coupling arrangement as recited in claim 2, wherein the indicator and spring members are produced together in one piece.

7. A coupling arrangement as recited in claim 1, wherein:
   a. the male pipe part has an annular groove; and
   b. the body has a radially inwardly directed flange which is interrupted by the slit aperture and which is adapted to engage the annular groove, thereby securing the body to the male pipe part.

8. A coupling arrangement as recited in claim 7, wherein the radially outwardly projecting flange on the body and the radially inwardly directed flange on the body are disposed substantially opposite each other.

* * * * *